(12) United States Patent
Larson (10) Patent No.: US 9,995,209 B2
(45) Date of Patent: Jun. 12, 2018

(54) ROTARY ENGINE

(71) Applicant: International Engine Intellectual Property Company, LLC, Lisle, IL (US)

(72) Inventor: Gerald L. Larson, Grand Haven, MI (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 588 days.

(21) Appl. No.: 14/661,255

(22) Filed: Mar. 18, 2015

(65) Prior Publication Data

US 2016/0273446 A1 Sep. 22, 2016

(51) Int. Cl.
*F02B 53/10* (2006.01)
*F02B 53/12* (2006.01)
(Continued)

(52) U.S. Cl.
CPC .............. *F02B 53/10* (2013.01); *F01C 1/356* (2013.01); *F02B 53/04* (2013.01); *F02B 53/12* (2013.01); *Y02T 10/17* (2013.01)

(58) Field of Classification Search
CPC .......... F02B 53/10; F02B 53/04; F02B 53/12; F01C 1/356; Y02T 10/17
USPC ... 123/213, 247, 200, 210, 143 R, 218, 228, 123/230, 241, 245, 43 R, 44 A, 44 D, 123/248; 418/36, 61.1, 160, 161, 209, 418/217, 607, 609, 228, 162, 175, 68; 475/267; 310/74, 112; 60/39.6, 39.62, 60/39.63
See application file for complete search history.

(56) References Cited

U.S. PATENT DOCUMENTS 975,643 A * 11/1910 Seitz ....................... F01C 1/356
418/228
2,858,770 A * 11/1958 Reynolds ................ F01C 9/007
418/215
(Continued)

FOREIGN PATENT DOCUMENTS

WO    WO 9413942 A1 *  6/1994 ............ F01C 1/3568
WO    WO 2005010322 A1 *  2/2005 .............. F01C 1/356

OTHER PUBLICATIONS

Motors Every Boy's Mechanical Library 1916, Para 198, Fig 116 by James Slough Zerbe.

*Primary Examiner* — Jason Newton
(74) *Attorney, Agent, or Firm* — Jeffrey P. Calfa; Jack D. Nimz (57) ABSTRACT

A rotary engine has a circular shaped rotor and stator. The rotor has an expansion chamber for combustion and the stator has thrust director gate that passes through a passageway through the stator face to alternatively ride along the face of the rotor or to ride within the expansion chamber of the rotor. Passageways through the stator and radially close to the thrust director gate allow for air, fuel, and an ignition source to pass through the stator allow for ignition and expansion of the fuel within the expansion chamber. The thrust director allows for thrust to be applied to the rotor to rotate the rotor. An exhaust manifold, also passing through stator, and also radially aligned with the expansion chamber allows exhaust gases from combustion to be released from the expansion chamber as the rotor rotates the expansion chamber adjacent to the exhaust manifold.

19 Claims, 6 Drawing Sheets

(51) Int. Cl.
*F02B 53/04* (2006.01)
*F01C 1/356* (2006.01)

(56) References Cited

U.S. PATENT DOCUMENTS

| | | | | |
|---|---|---|---|---|
| 3,687,117 A | * | 8/1972 | Panariti | F01B 3/0032 |
| | | | | 123/197.1 |
| 3,702,602 A | * | 11/1972 | Lotesto | F02B 53/00 |
| | | | | 123/45 R |
| 2017/0089201 A1 | * | 3/2017 | Farazifard | F01B 29/04 |

* cited by examiner

ROTARY ENGINE

BACKGROUND

This disclosure relates to internal combustion engines, specifically a rotary engine with a large expansion ratio.

Rotary engines are Otto Cycle Engines that operate differently than conventional reciprocating or piston driven engines. In a piston driven engine, combustion occurs in a cylinder that is not directly engaged to a drive shaft or output shaft. Combustion in a piston driven engine occurs within cylinders, which drive pistons, which are engaged through connecting rods to an output shaft or cam shaft for indirect operation. In a rotary engine, combustion occurs within a combustion chamber that directly causes output shaft rotation. Rotary engines as a result have less moving parts.

SUMMARY

This disclosure involves a rotary engine with a circular disc shaped rotor and a circular shaped stator. The rotor is engaged to an output shaft for transmitting mechanical energy to generator or a transmission. The rotor has an expansion chamber for combustion and the stator has thrust director gate that passes through a stator face to alternatively ride along the face of the rotor or to ride within the expansion chamber of the rotor. Passageways through the stator and radially close to the thrust director gate allow for air, fuel, and an ignition source to pass through the stator allow for ignition and expansion of the fuel within the expansion chamber. The thrust director gate allows for thrust to be applied to the rotor to rotate the rotor. An exhaust manifold, also passing through stator, and also radially aligned with the expansion chamber allows exhaust gases from combustion to be released from the expansion chamber as the rotor rotates the expansion chamber adjacent to the exhaust manifold.

The expansion chamber is a protrusion from the rotor in an axial direction from the rotor face. The expansion chamber may be half donut shaped. The rotor operates in close proximity to the stator. The expansion chamber protrudes from the rotor axially opposite the rotor face that is in close proximity to the stator. The thrust director gate passes through a stator face of the stator. The distal end of the thrust director gate is shaped to ride within and closely align with the contours of the expansion chamber as the rotor rotates expansion chamber past the thrust director gate.

An air charge manifold, a fuel injector engaged to a fuel injector line, and a fuel igniter are all engaged to passageways through the stator face in a similar radial location or curved line as the thrust director gate and the expansion chamber. The thrust director gate, air charge manifold, fuel injector, and fuel igniter are engaged such that upon rotor rotation the leading edge of the expansion chamber comes into contact with the thrust director gate first and the thrust director gate is urged into the expansion chamber. Then the expansion chamber comes into contact with the air charge manifold, fuel injector, and fuel igniter. Air from the air charge manifold enters the expansion chamber through a passageway through the stator face. Fuel enters the expansion chamber through the fuel injector line and the fuel injector through a passageway through the stator face. A fuel igniter, such as a spark plug, is engaged through a passageway through the stator face to allow the fuel igniter to commence ignition of the air and fuel mixture within the expansion chamber. The expansion of the air and fuel mixture along with exhaust gases applies force against the thrust director gate, which results in an expansion of the effective volume of the expansion chamber and drives the rotor to rotate relative to the stator.

The exhaust manifold, also passes through stator, and is radially aligned with the expansion chamber. During rotor rotation driven by gas expansion, the leading edge of the expansion chamber becomes aligned with the exhaust manifold. This allows exhaust gases from combustion to be released from the expansion chamber as the rotor rotates the expansion chamber adjacent to the exhaust manifold. The cycle will be repeated as the leading edge of the expansion chamber then comes around to the thrust director gate.

The thrust director gate is biased towards insertion into the expansion chamber through a spring or other elastic object used to store mechanical energy or through an actuator such as a solenoid or hydraulic actuator. Where a spring is used, the thrust director gate is directed against the rotor face and the inner surface of the expansion chamber alternatively and depending on where the rotor is at within its radial cycle. Where an actuator is used, the thrust director gate is pushed into the expansion chamber as the leading edge of the expansion chamber reaches the thrust director gate, and then withdrawn from the expansion chamber as a trailing edge of the expansion chamber passes the thrust director gate.

The rotary engine is well suited for air cooling since the twin rotor configuration allows for molding centrifugal vanes—thus operating as a centrifugal fan with air brought in over the stators and exiting through the rotors.

The foregoing summary, accompanied by further detail of the disclosure, will be presented in the Detailed Description below with reference to the following drawings that are part of this disclosure.

DESCRIPTION OF THE DRAWINGS

FIG. 2a is a top down view of the rotary engine of FIG. 1.

FIG. 2b is a side view of the rotary engine of FIG. 2a.

FIG. 3b is a side view of the rotor of FIG. 3a.

FIG. 4a is a bottom view of a dual rotor, dual stator version of a rotary engine.

FIG. 4b is a side view of the rotary engine of FIG. 4a

FIG. 7b is a side cutaway cross sectional view B-B of the rotary engine of FIG. 7a.

DETAILED DESCRIPTION

Figure 1:
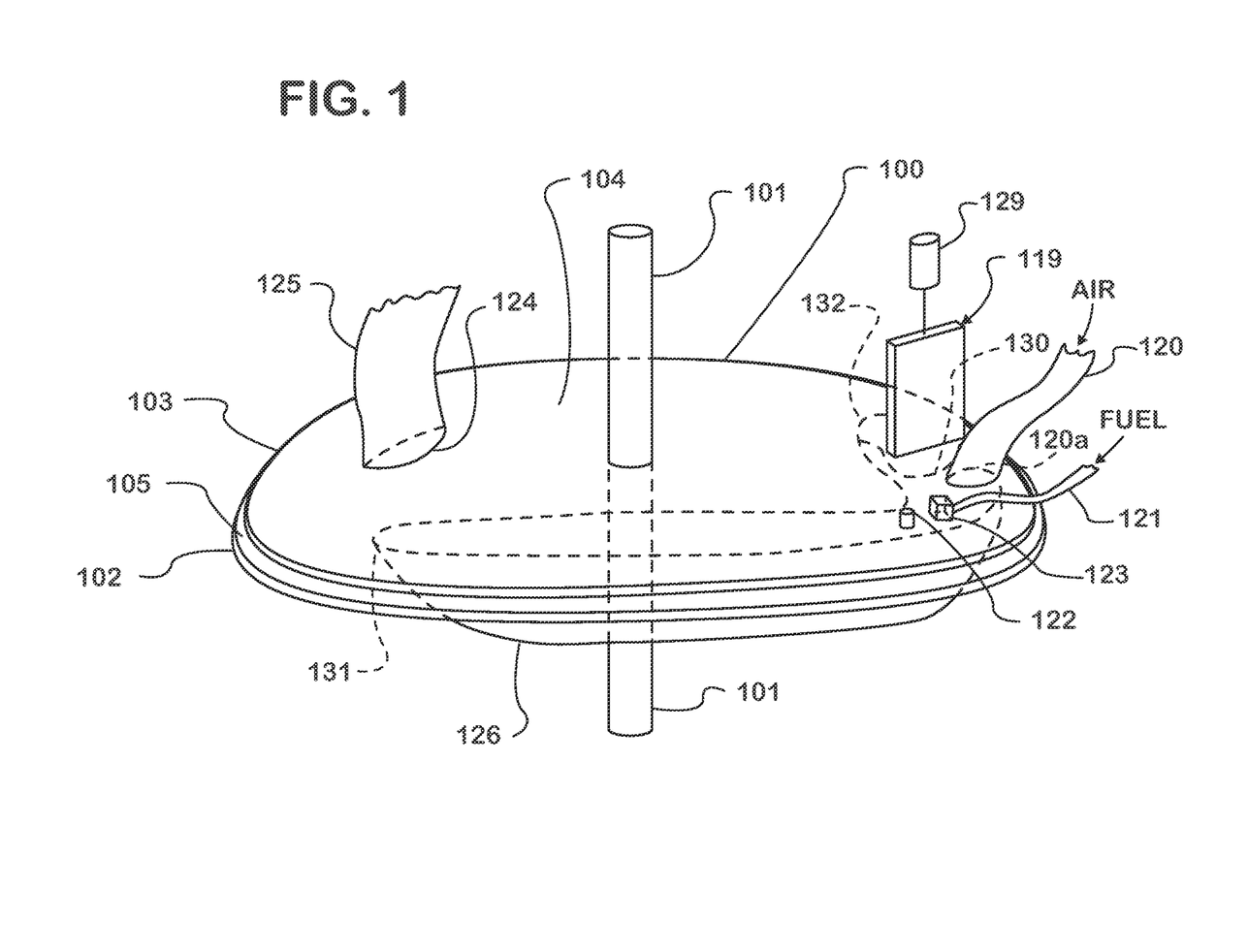
FIG. 1 is a perspective diagram of a rotor and stator of a rotary engine.
Figure 6:
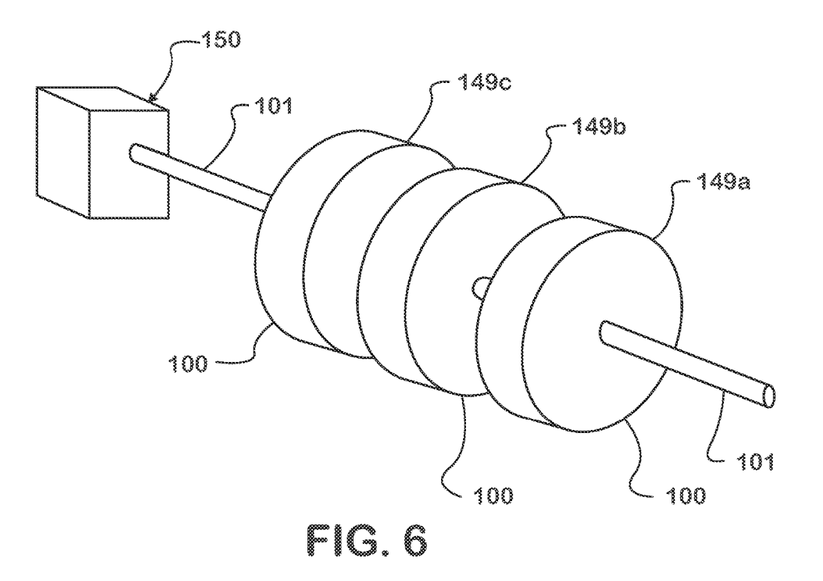
FIG. 6 is perspective view of three rotary engines aligned in parallel to drive a power load.

FIG. 1 shows a rotary engine 100 with a circular disc shaped rotor 102 and a circular shaped stator 103. The rotor 102 is engaged to an output shaft 101 for transmitting mechanical energy to a power load such as a generator or a transmission 150, such as shown in FIG. 6. The rotor 102 has an expansion chamber 126 for combustion and the stator 103 has thrust director gate 119 that passes through a stator face 104 to alternatively ride along the rotor face 105 of the rotor 102 or to ride within the expansion chamber 126 of the rotor 102. Passageways through the stator 103 and radially close to the thrust director gate 119 allow for air, fuel, and an ignition source to pass through the stator 103 allow for ignition and expansion of the fuel within the expansion chamber 126. The thrust director gate 119 allows for thrust to be applied to the rotor 102 to rotate the rotor 102. An exhaust manifold 125, also passing through stator 103 and also radially aligned with the expansion chamber 126 allows exhaust gases from combustion to be released from the expansion chamber 126 as the rotor 102 rotates the expansion chamber 126 adjacent to align with the exhaust manifold 125.

The expansion chamber 126 is a protrusion from the rotor 102 in an axial direction from the rotor face 105. The expansion chamber 126 may be half donut shaped as shown in FIGS. 1, 2a and 2b, and 3a and 3b, however it may be any shape that allows the thrust director gate 119 to seal combustion gases from passing from the area of the expansion chamber 126 where combustion occurs to the area on the other side of the thrust director gate 119. The rotor 102 operates in close proximity to the stator 103. The expansion chamber 126 protrudes from the rotor 102 axially opposite the rotor face 105 in close proximity to the stator 103. The thrust director gate 119 passes through a stator face 104 of the stator 103. The distal end 130 of the thrust director gate 119 is shaped to ride within and closely align with the contours of the expansion chamber 126 as the rotor 102 rotates expansion chamber 126 past the thrust director gate 119.

The surface of the expansion chamber 126 from a leading edge of the expansion chamber 131 to the expansion chamber lower surface 127 is sloped, as shown downward in FIG. 1, to allow a distal end of the thrust director gate 130 to smoothly transition from the stator face 104 to the expansion chamber lower surface 127 at the beginning of the power stroke or power rotation of the rotary engine 101. Similarly, the surface of the expansion chamber 126 from a trailing edge of the expansion chamber 132 to the expansion chamber lower surface 127 is sloped upwards, in the geometry shown in FIG. 1, to allow the distal end of the thrust director gate 130 to smoothly transition from the expansion chamber lower surface 127 to the stator face 104 at the end of the power stroke.

An air charge manifold 120, a fuel injector 123 engaged to a fuel injector line 121, and a fuel igniter 122, such as a spark plug, are all engaged to passageways through the stator face 104 in a similar radial location or curved line as the thrust director gate 119 and the expansion chamber 126. The air charge manifold 120 is shown engaged to an air charge manifold passageway 120a through the stator face 104.

In a diesel fueled version of the rotary engine, there would be no fuel igniter. Pressure generated by the thrust director gate 119 against a diesel and air mixture would result in ignition.

Figure 5A:
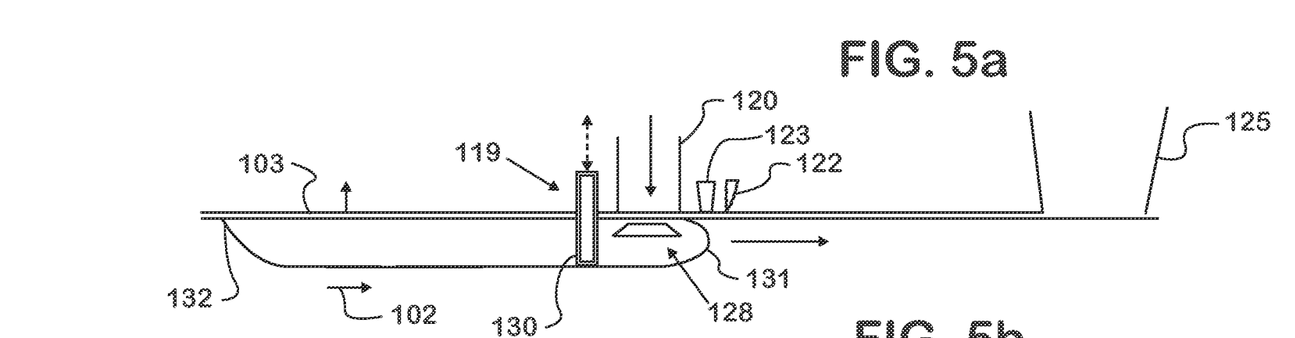
FIG. 5a is a side cutaway cross sectional view A-A of the rotary engine of FIG. 4a in a first stage of rotation cycle.
Figure 5B:
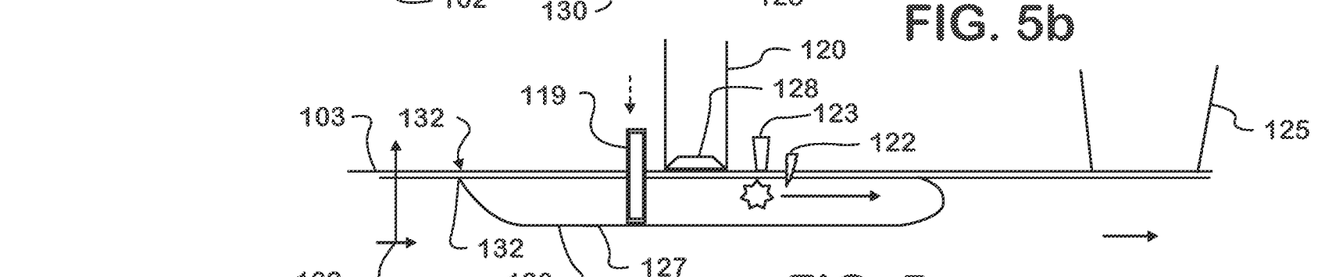
FIG. 5b is a side cutaway cross sectional view A-A of the rotary engine of FIG. 4a in a second stage of rotation cycle.
Figure 5C:
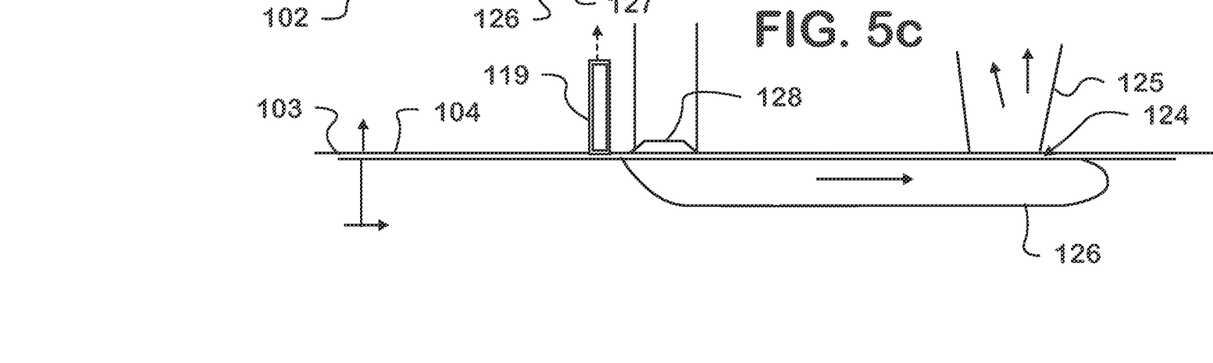
FIG. 5c is a side cutaway cross sectional view A-A of the rotary engine of FIG. 4a in a third stage of rotation cycle.

FIGS. 5a, 5b, and 5c, show that the thrust director gate 119, air charge manifold 120, fuel injector 123, and fuel igniter 122 are engaged such that upon rotor 102 rotation, the leading edge of the expansion chamber 131 comes into contact with the thrust director gate 119 first and the thrust director gate 119 is urged into the expansion chamber 126. Then the expansion chamber 126 comes into contact with the air charge manifold 120, fuel injector 123, and fuel igniter 122. Air from the air charge manifold 120 enters the expansion chamber 126 through a passageway through the stator face 104. Fuel enters the expansion chamber through the fuel injector line 121 and the fuel injector 123 through a passageway through the stator face 104. A fuel igniter 122, such as a spark plug, is engaged through a passageway through the stator face 104 to allow the fuel igniter 122 to commence ignition of the air and fuel mixture within the expansion chamber 126. The expansion of the air and fuel mixture along with exhaust gases applies force against the thrust director gate 119 and the inner surfaces of the expansion chamber 126, which results in an expansion of the effective volume of the expansion chamber 126 and which in turn drives the rotor 102 to rotate relative to the stator 103, and hence rotate the output shaft 101.

In FIG. 6, there are three similar rotary engines 100 engaged to an output shaft 101, which is in engaged to provide mechanical rotation energy to a power load 150, such as a transmission, or generator.

FIGS. 1, 5a, 5b, and 5c show that the exhaust manifold 125 also passes through stator 103 thru an exhaust port 124, and is radially aligned with the expansion chamber 126. During rotor 102 rotation driven by combustion gas expansion, the leading edge of the expansion chamber 131 becomes aligned with the exhaust manifold 125. This allows exhaust gases from combustion to be released from the expansion chamber 126 as the rotor 102 rotates the expansion chamber 126 adjacent to and past the exhaust manifold 125 until the trailing edge of the expansion chamber 132 passes the exhaust port 124. The cycle will be repeated as the leading edge of the expansion chamber 131 then comes around to the thrust director gate 119.

The thrust director gate 119 is biased towards insertion into the expansion chamber 126 through a thrust director actuator 129. The thrust director actuator 129 may be a spring or other elastic object used to store mechanical energy or be an actuator such as a solenoid or hydraulic actuator. Where a spring is used, the thrust director gate 119 is directed against the rotor face 105 and the expansion chamber lower surface 127 alternatively and depending on where the rotor 102 is at within its radial cycle. Where an actuator is used, the thrust director gate 119 is pushed into the expansion chamber 126 as the leading edge of the expansion chamber 131 reaches the thrust director gate 119, and then withdrawn from the expansion chamber 126 as a trailing edge of the expansion chamber 132 passes the thrust director gate 119.

Figures 2A, 2B:
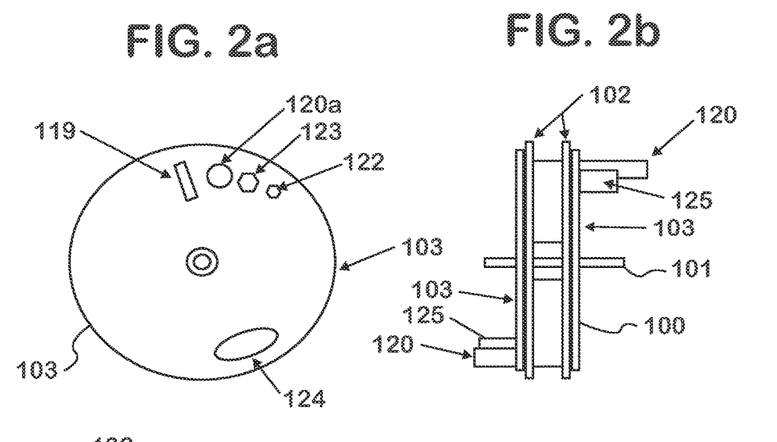
Figure 3A:
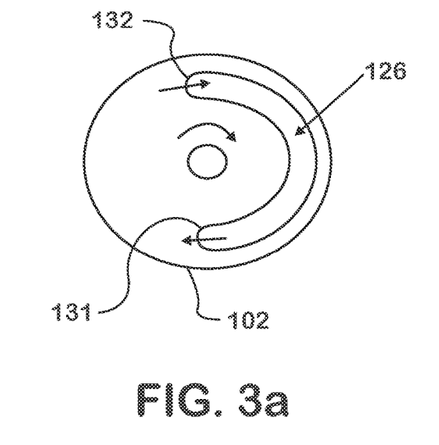
FIG. 3a is a top down view of the rotor of the rotary engine of FIG. 1.
Figure 3B:
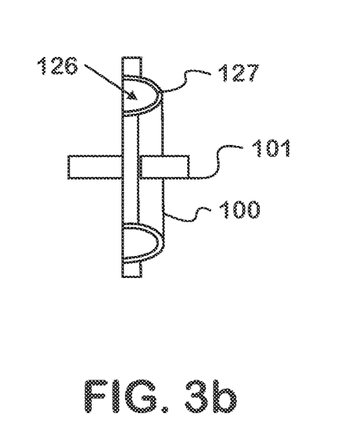
Figures 4A, 4B:
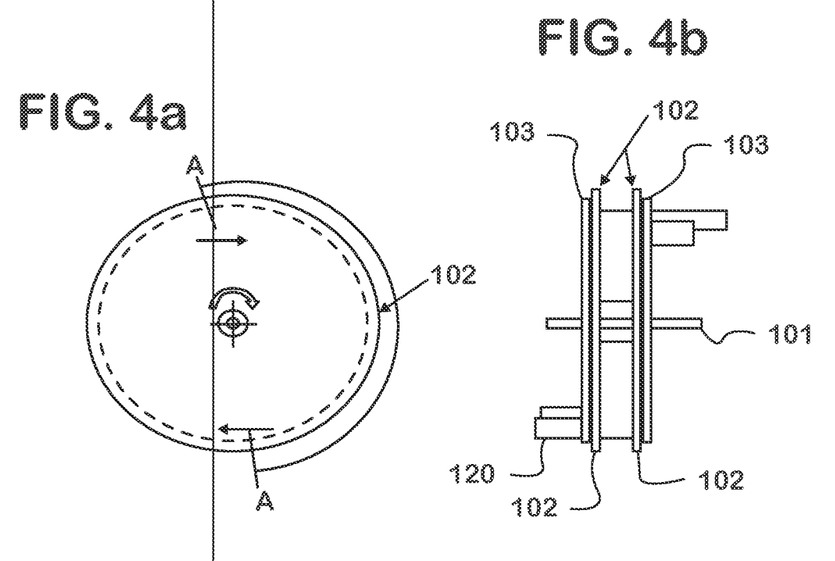

FIGS. 2b and 4b show that in one configuration, a rotary engine 100 may contain two back to back pairs of rotors 102 and stators 103 engaged to the same output shaft 101 in order to mechanically balance rotational load. In one configuration of the two rotor, two stator rotary engine, the expansion chambers 126 are radially aligned to even the thrust on the output shaft 101. The circular segments defined by the expansion chambers 126 are opposingly aligned as shown in FIGS. 2b and 4b. This means the expansion chambers 126 face each other along the output shaft 101.

FIGS. 5a, 5b, and 5c are side cutaway cross sectional views A-A of the rotary engine of FIG. 4a in three successive stages of rotation cycle. As cutaway A-A is a circular segment of the rotatory engine, FIGS. 5a, 5b, and 5c are essentially views of the rotary engine 100 straightened out to demonstrate the inter-relationships between the thrust director 119, rotor 102, stator 103, and the expansion chamber 126 through different stages of combustion within the expansion chamber 126. FIG. 5a demonstrates the operation of charge air delivery. As the leading edge of the thrust director gate 131 approaches the air charge inlet manifold 120, air is injected into the expansion chamber 126 thru a charge air valve 128 between the leading edge of the thrust director gate 131 and the thrust gate director 131. FIG. 5b demonstrates the operation of power production. The charge air valve 128 is closed. As the leading edge of the thrust director gate 131 approaches and uncovers the fuel injector 123 and the fuel igniter 122, operation of the fuel igniter 122 results in combustion and gas expansion within the expansion chamber 126. This expansion results in force applied to the walls of the expansion chamber 126 on the side of the thrust director gate 119 where the air charge manifold 120, the fuel injector 123m, and the fuel igniter 122 connect to the expansion chamber 126. The force against the thrust director gate 119 causes a force to rotate the rotor 102 as shown. FIG. 5c demonstrates the exhaust cycle. As the leading edge of the thrust director gate 131 approaches and uncovers the exhaust port 124, combustion gases flow out of the expansion chamber 126 into the exhaust manifold 125. The cycle continues.

Figure 7A:
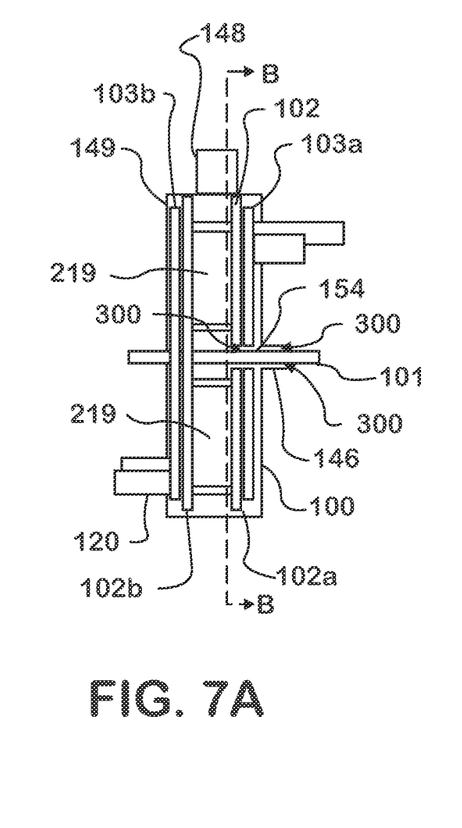
FIG. 7a is a side view of a dual rotor, dual stator version of a rotary engine with centrifugal fan vanes installed between the rotors.
Figure 7B:
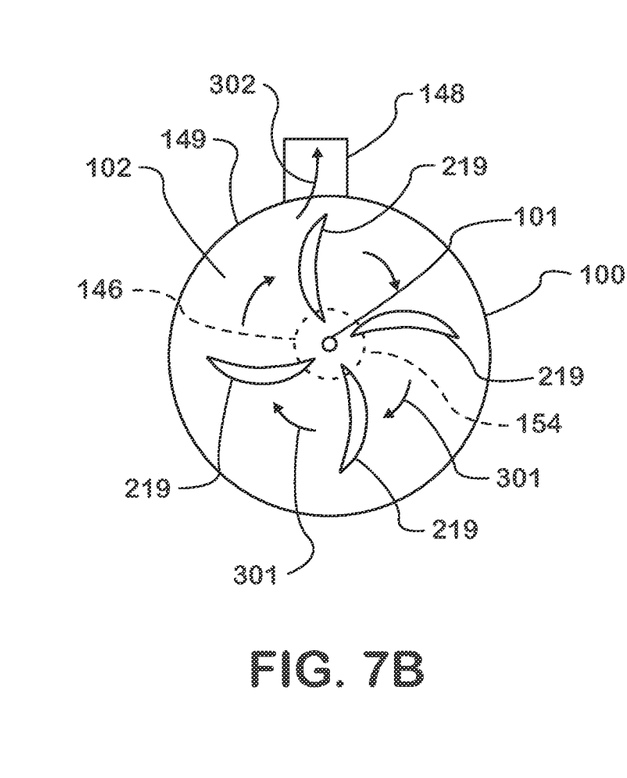

FIG. 7a and FIG. 7b show a dual rotor, dual stator version of a rotary engine 100 with centrifugal radial fan vanes 219. A rotary engine housing 149 encompasses a first rotor 102a, a second rotor 102b, a first stator 103a, and a second stator 103b. There are radial fan blades 219 engaged to and between the first rotor 102a and the second rotor 102b. There is a radial air inlet 146 engaged to the rotary engine housing 149 allowing entry air flow 300 to the rotary engine housing 149 and further allowing air flow in vicinity of the first stator 103a outer face and then passing through a passage way 151 near the center of the first stator 103a and the first rotor 102a. The radial fan blades 219 move air flow in a radial air direction 301. This results in cooling of the first rotor 102a, the second rotor 102b and the first stator 103a. There is a radial air outlet 148. As air comes into the vicinity of the radial air outlet 148, the air flow turns in air exit direction 302 to exit the rotary engine housing 149 through the radial air outlet 148.

As described above, the rotary engines of this disclosure provide a number of advantages, some of which have been described above and others of which are inherent in the disclosure. Also modifications may be proposed to the rotary engines of this disclosure without departing from the teachings herein.

What is claimed is:

1. A rotary engine, comprising:
   a circular shaped rotor and a circular shaped stator;
   the rotor being engaged to an output shaft for transmitting mechanical energy;
   the rotor having an expansion chamber for combustion;
   the stator having a thrust director gate passing through a stator face to alternatively ride along a face of the rotor or to ride within the expansion chamber of the rotor;
   passageways through the stator face and radially close to the thrust director gate allowing for air, fuel, and an ignition source to pass through the stator allowing for ignition and expansion of combustion gases of the fuel within the expansion chamber;
   the thrust director gate allowing for thrust to be applied to the rotor to rotate the rotor; and
   an exhaust manifold, also passing through the stator, and also radially aligned with the expansion chamber allowing for exhaust gases from combustion to be released from the expansion chamber as the rotor rotates the expansion chamber adjacent to the exhaust manifold.

2. The rotary engine as set forth in claim 1 further comprising:
   the expansion chamber is a protrusion from the rotor in an axial direction from the rotor face;
   the rotor operates in close proximity to the stator; and
   the expansion chamber protrudes from the rotor axially opposite the rotor face that is in close proximity to the stator.

3. The rotary engine as set forth in claim 2 further comprising: a distal end of the thrust director gate being shaped to ride within and closely align with the expansion chamber as the rotor rotates the expansion chamber past the thrust director gate.

4. The rotary engine as set forth in claim 2 in which the expansion chamber being half donut shaped.

5. The rotary engine as set forth in claim 3, further comprising:
   an air charge manifold, a fuel injector engaged to a fuel injector line, and a fuel igniter engaged to their respective passageways through the stator face in a similar radial location as the thrust director gate and the expansion chamber;
   the thrust director date, air charge manifold, fuel injector, and fuel igniter being engaged such that upon rotor rotation a leading edge of the expansion chamber coming into contact with the thrust director gate first with the thrust director gate being urged into the expansion chamber through a thrust director gate actuator;
   upon such rotation of the rotor, the expansion chamber coming into contact with the air charge manifold, fuel injector, and fuel igniter;
   the air charge manifold configured such that air from the air charge manifold enters the expansion chamber through a first passageway of the passageways through the stator face;
   the fuel injector and fuel injector line configured such that fuel enters the expansion chamber through the fuel injector line and the fuel injector through a second passageway of the passageways through the stator face; and
   the fuel igniter being engaged through a third passageway of the passageways through the stator face to allow the fuel igniter to commence ignition of the air and fuel mixture within the expansion chamber.

6. The rotary engine as set forth in claim 1, further comprising:
   a surface of the expansion chamber from a leading edge of the expansion chamber to an expansion chamber lower surface being sloped to allow a distal end of the thrust director gate to smoothly transition from the stator face to the expansion chamber lower surface at the beginning of a power stroke of the rotary engine; and
   a surface of the expansion chamber from a trailing edge of the expansion chamber to the expansion chamber lower surface being sloped upwards to allow the distal end of the thrust director gate to smoothly transition from the expansion chamber lower surface to the stator face at the end of the power stroke.

7. The rotary engine as set forth in claim 1, wherein the expansion chamber is half donut shaped.

8. The rotary engine as set forth in claim 5, wherein the thrust director gate actuator is a spring.

9. The rotary engine as set forth in claim 5, wherein the thrust director gate actuator is a hydraulic actuator.

10. The rotary engine as set forth in claim 5, wherein the thrust director gate actuator is a solenoid.

11. The rotary engine as set forth in claim 3, wherein the output shaft is engaged to a vehicle transmission.

12. The rotary engine as set forth in claim 3, wherein the output shaft is engaged to an electrical generator.

13. A rotary engine, comprising:
a circular shaped first rotor and a circular shaped first stator;
the first rotor being engaged to an output shaft for transmitting mechanical energy;
the first rotor having a first expansion chamber for combustion;
the first stator having a first thrust director gate passing through a first stator face to alternatively ride along a face of the first rotor or to ride within the first expansion chamber of the first rotor;
a circular shaped second rotor and a circular shaped second stator;
the second rotor being engaged to the output shaft;
the second rotor having a second expansion chamber for combustion configured such that the second expansion chamber faces the first expansion chamber;
the second stator having a second thrust director gate passing through a second stator face to alternatively ride along a face of the second rotor or to ride within the second expansion chamber of the second rotor;
a first plurality of passageways through the first stator and radially close to the first thrust director gate allowing for air, fuel, and an ignition source to pass through the first stator allowing for ignition and expansion of combustion gases of the fuel within the first expansion chamber;
a second plurality of passageways through the second stator and radially close to the second thrust director gate allowing for air, fuel, and an ignition source to pass through the second stator allowing for ignition and expansion of combustion gases of the fuel within the second expansion chamber;
the first plurality of passageways through the first stator being axially opposed to the second plurality of passageways through the second stator;
the first thrust director gate allowing for thrust to be applied to the first rotor to rotate the first rotor;
the second thrust director gate allowing for thrust to be applied to the second rotor to rotate the second rotor;
a first exhaust manifold passing through the first stator, and radially aligned with the first expansion chamber allowing for exhaust gases from combustion to be released from the first expansion chamber as the first rotor rotates the first expansion chamber adjacent to the first exhaust manifold; and
a second exhaust manifold passing through the second stator, and radially aligned with the second expansion chamber allowing for exhaust gases from combustion to be released from the second expansion chamber as the second rotor rotates the first expansion chamber adjacent to the first exhaust manifold.

14. The rotary engine of claim 13, wherein: the first expansion chamber and the second expansion chamber define circular segments that are opposingly aligned.

15. The rotary engine of claim 13, further comprising:
radial fan blades that are engaged to and between the first rotor and the second rotor.

16. The rotary engine of claim 15, further comprising:
a rotary engine housing encompassing the first rotor, the second rotor, the first stator, and the second stator;
a radial air inlet engaged to the rotary engine housing allowing entry air flow to the rotary engine housing and further allowing air flow in vicinity of the first stator; and
a radial air outlet engaged to the rotary engine housing allowing air moved by the radial fan blades to exit the rotary engine housing.

17. A rotary engine, comprising:
a circular shaped rotor and a circular shaped stator;
the rotor being engaged to an output shaft for transmitting mechanical energy;
the rotor having an expansion chamber for combustion;
the stator having a thrust director gate passing through a stator face to alternatively ride along a face of the rotor or to ride within the expansion chamber of the rotor;
passageways through the stator face and radially close to the thrust director gate allowing for air and fuel to pass through the stator allowing for ignition and expansion of combustion gases of the fuel within the expansion chamber;
the thrust director gate allowing for thrust to be applied to the rotor to rotate the rotor; and
an exhaust manifold, also passing through the stator, and also radially aligned with the expansion chamber allowing for exhaust gases from combustion to be released from the expansion chamber as the rotor rotates the expansion chamber adjacent to the exhaust manifold.

18. The rotary engine as set forth in claim 17, further comprising:
the expansion chamber is a protrusion from the rotor in an axial direction from the rotor face;
the rotor operates in close proximity to the stator; and
the expansion chamber protrudes from the rotor axially opposite the rotor face that is in close proximity to the stator.

19. The rotary engine as set forth in claim 18, further comprising:
a distal end of the thrust director gate being shaped to ride within and closely align with the contours of the expansion chamber as the rotor rotates the expansion chamber past the thrust director gate.

* * * * *